United States Patent
Mitsumori et al.

(10) Patent No.: US 6,274,040 B1
(45) Date of Patent: *Aug. 14, 2001

(54) APPARATUS FOR REMOVING ELECTROSTATIC CHARGE FROM HIGH RESISTIVITY LIQUID

(75) Inventors: Kenichi Mitsumori; Yasuhiko Kasama, both of Sendai; Akira Nakano, Furukawa; Akira Abe; Tadahiro Ohmi, both of Sendai, all of (JP)

(73) Assignee: Alps Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/811,800

(22) Filed: Mar. 6, 1997

Related U.S. Application Data

(62) Division of application No. 08/482,358, filed on Jun. 7, 1995, now abandoned, which is a division of application No. 08/219,154, filed on Mar. 29, 1994, now Pat. No. 5,480,563.

(30) Foreign Application Priority Data

Apr. 9, 1993 (JP) .................................................... 5-107642

(51) Int. Cl.$^7$ ........................................................ C02F 1/48
(52) U.S. Cl. ........................................... 210/243; 210/900
(58) Field of Search .................................. 204/164, 196, 204/275, 284, 290 R; 210/748, 243, 900; 361/215

(56) References Cited

U.S. PATENT DOCUMENTS

| 4,399,020 | * | 8/1983 | Branchick et al. | 204/275 |
| 4,861,345 | | 8/1989 | Bowker et al. | 29/623.1 |
| 4,956,848 | | 9/1990 | Terai et al. | 372/87 |
| 5,128,043 | | 7/1992 | Wildermuth | 210/695 |

FOREIGN PATENT DOCUMENTS 60-876   5/1985   (JP) .

* cited by examiner

*Primary Examiner*—Ivars Cintins
(74) *Attorney, Agent, or Firm*—Brinks Hofer Gilson & Lione

(57) ABSTRACT

There are provided a method and an apparatus for removing electrostatic charges from high resistivity liquid. An insulating film is formed on the surface of a conductive element which is in contact with the high resistivity liquid wherein the insulating film has such a thickness that a tunneling current may flow through the insulating film, thereby preventing the highly purified high resistivity liquid from being contaminated, as well as from becoming acid. Thus, objects to be treated with the high resistivity liquid become free of electrostatic charges without any contamination.

3 Claims, 8 Drawing Sheets

CARBON DIOXIDE GAS

PIPE POTENTIAL VS SURFACE POTENTIAL

HEAT TREATMENT TIME VS THICKNESS OF CHROMIUM OXIDE

NOZZEL POTENTIAL VS SURFACE POTENTIAL

APPARATUS FOR REMOVING ELECTROSTATIC CHARGE FROM HIGH RESISTIVITY LIQUID

This application is a division of application Ser. No. 08/482,358, filed Jun. 7, 1995, now abandoned, which is a division of application Ser. No. 08/219,154, filed Mar. 29, 1994, now U.S. Pat. No. 5,480,563.

BACKGROUND OF THE INVENTION

1. Field of the Invention

The present invention relates to a method of removing electrostatic charges from high resistivity liquid such as purified water or the like used to produce devices that are sensitive to electrostatic charges, for example semiconductor devices or liquid crystal devices. The present invention also relates to an apparatus for effectively implementing this method.

2. Description of the Related Art

In recent years, there has been achieved a great improvement in the purity of high resistivity liquid such as purified water used in production of semiconductor devices or liquid crystal devices. As a result, the resistivity of purified water has reached near the theoretical upper limitation of 18.25 M$\Omega$-cm (at 25° C.).

This has been brought about by the improvement in purity of chemicals and by the improvement in utilities for supplying the purified water which can prevent impurities contained in the pipe material from being dissolved into the purified water.

However, the improvement in purity has also brought about a problem that the high purity water and other high resistivity liquid are readily electrostatically charged.

For example, it is very common that high purity water having a resistivity of 18.24 M$\Omega$-cm (at 25° C.) is charged up to about 1000 V after passing through a teflon-based pipe. The high purity water charged up at such a high voltage sometimes damages the performance of a transistor that is one of components of a semiconductor device or a liquid crystal device.

One known technique to solve the above problem is to reduce the resistivity by introducing carbon dioxide into the highly purified liquid having a high resistivity, as shown in FIGS. 8 and 9. FIG. 8 is a cross-sectional view of a conventional apparatus for introducing carbon dioxide into high resistivity liquid via a film 71 that is permeable for gas. FIG. 9 is a cross-sectional view of a conventional apparatus for bubbling carbon dioxide gas through high resistivity liquid.

In these conventional methods or apparatus, however, the highly purified water having a high resistivity is often contaminated with impurities during the dissolving process of carbon dioxide gas. Moreover, a residual carbonate or dissolved carbon dioxide makes the high resistivity liquid acid, which may damage semiconductor devices or liquid crystal devices. Another problem is that the carbon dioxide dissolved in the high resistivity liquid is vaporized due to the change in temperature or pressure, and vaporized gas chokes the pipe. When purified water is used as high resistivity liquid, bacteria can readily breed in it. Besides, it is difficult to control the dissolution of carbon dioxide because the amount of carbon dioxide dissolved in purified water varies depending on temperature and pressure.

SUMMARY OF THE INVENTION

The present invention has been established to solve the above problems the conventional techniques have.

In a first aspect of the present invention, there is provided a method of removing electrostatic charges from high resistivity liquid, which comprises holding a conductive element, that is in contact with high resistivity liquid, at a specific potential.

In a second aspect of the present invention, there is provided a method of removing electrostatic charges from high resistivity liquid according to the first aspect, wherein the above-mentioned conductive element is provided with an insulating film on the surface thereof, the insulating film having such a thickness that a tunneling current can flow through the insulating film.

In a third aspect of the present invention, there is provided a method of removing electrostatic charges from high resistivity liquid according to the second aspect, wherein the above-mentioned insulating film comprises a chromium oxide in the passive state, and the above-mentioned conductive element comprises stainless steel.

In a fourth aspect of the present invention, there is provided a method of removing electrostatic charges from high resistivity liquid according to the first or the second aspect, wherein the above-mentioned high resistivity liquid is purified water.

In a fifth aspect of the present invention, there is provided an apparatus for removing electrostatic charges from high resistivity liquid, comprising: a conductive element; means for holding the conductive element at a specific potential; and means for disposing the conductive element such that the conductive element may be in contact with the high resistivity liquid.

In a sixth aspect of the present invention, there is provided an apparatus for removing electrostatic charges from high resistivity liquid according to the fifth aspect, wherein the above-mentioned conductive element is provided with an insulating film on the surface thereof, the insulating film having such a thickness that a tunneling current can flow through the insulating film.

In a seventh aspect of the present invention, there is provided an apparatus for removing electrostatic charges from high resistivity liquid according to the sixth aspect, wherein the above-mentioned insulating film comprises a chromium oxide in the passive state, and the above-mentioned conductive element comprises stainless steel.

In an eighth aspect of the present invention, there is provided an apparatus for removing electrostatic charges from high resistivity liquid according to the fifth or the sixth aspect, wherein the above-mentioned high resistivity liquid is purified water.

DESCRIPTION OF THE PREFERRED EMBODIMENTS

Figure 1:
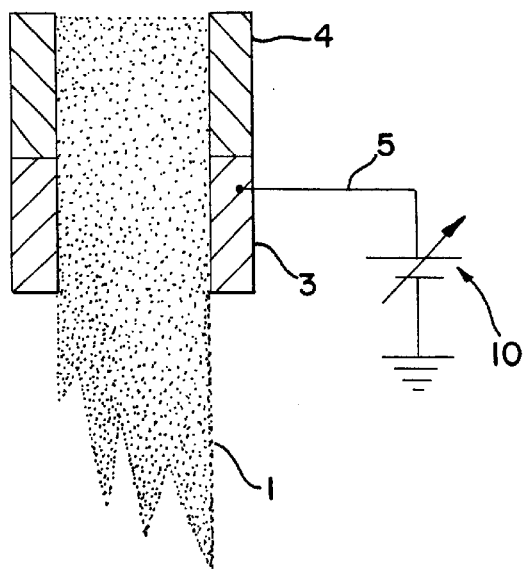
FIG. 1 is a cross-sectional view showing the arrangement of a first embodiment.
Figure 1:
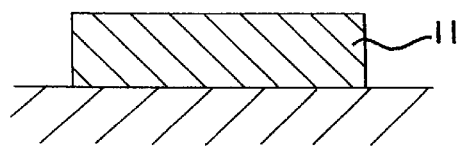
Figure 2:
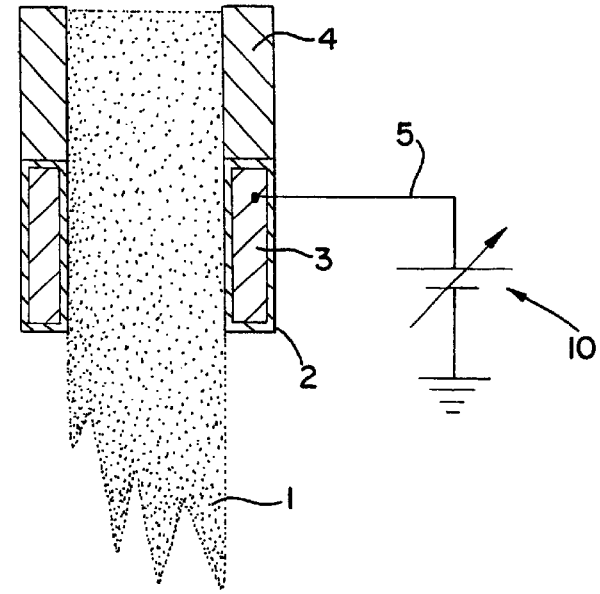
FIG. 2 is a cross-sectional view showing the arrangement of a third embodiment.
Figure 2:
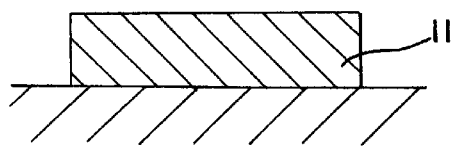
Figure 3:
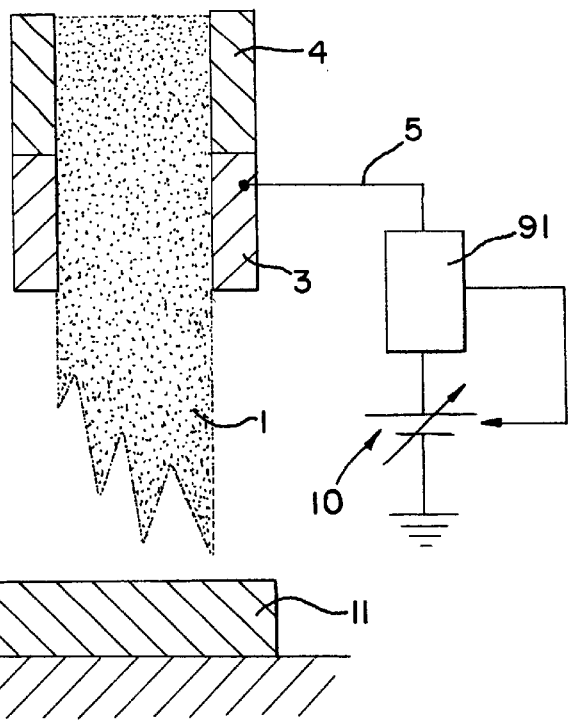
FIG. 3 is a cross-sectional view showing the arrangement of a fourth embodiment.
Figure 4:
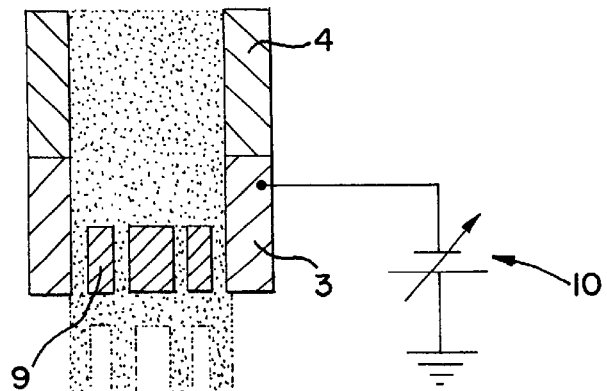
FIG. 4 is a cross-sectional view showing the arrangement of a fifth embodiment.

In the method of removing electrostatic charges from high resistivity liquid according to the first aspect of the present invention, the conductive element, that is in contact with high resistivity liquid, is held at a specific potential whereby the electrostatic potential induced in the high resistivity liquid is restricted to the above-mentioned specific potential via the above-mentioned conductive element.

As a result, the high resistivity liquid will lose the electrostatic charges by the time it is actually used, and thus the high resistivity liquid can be used for the production of semiconductor devices or liquid crystal devices which are sensitive to the electrostatic charge without damaging these devices.

In the method of removing electrostatic charges from high resistivity liquid according to the second aspect of the present invention, the conductive element according to the first aspect is provided with an insulating film on the surface thereof, wherein the insulating film has such a thickness that a tunneling current can flow through the insulating film, whereby the high resistivity liquid may be held at the specific potential, and furthermore, the dissolution of metallic ions may be prevented.

In the method of removing electrostatic charges from high resistivity liquid according to the third aspect of the present invention, the above-mentioned insulating film according to the second aspect comprises a chromium oxide in the passive state, and the above-mentioned conductive element comprises stainless steel, which ensures the formation of the insulating film that has such a thickness that a tunneling current may flow through the insulating film.

Thus, the method according to the third aspect of the present invention ensures the reliable implementation of the second aspect of the present invention.

In the method of removing electrostatic charges from high resistivity liquid according to the fourth aspect of the present invention, purified water is used as the above-mentioned high resistivity liquid according to any aspects from the first through the third, whereby the present invention may be applied to a cleaning process with the purified water which is very popular in the production of semiconductor devices or liquid crystal devices. Thus, the advantages of the present invention according to the first through the third aspects can be realized in the production of these devices.

The apparatus for removing electrostatic charges from high resistivity liquid according to the fifth aspect, provides implementation of the method of removing electrostatic charges from high resistivity liquid according to the first aspect of the present invention.

The apparatus for removing electrostatic charges from high resistivity liquid according to the sixth aspect, provides implementation of the method of removing electrostatic charges from high resistivity liquid according to the second aspect of the present invention.

The apparatus for removing electrostatic charges from high resistivity liquid according to the seventh aspect, provides implementation of the method of removing electrostatic charges from high resistivity liquid according to the third aspect of the present invention.

The apparatus for removing electrostatic charges from high resistivity liquid according to the eighth aspect, provides implementation of the method of removing electrostatic charges from high resistivity liquid according to the fourth aspect of the present invention.

DESCRIPTION OF THE PREFERRED EMBODIMENTS

Referring to the accompanying drawings, the preferred embodiments of the present invention will be described below.

Embodiment 1

In the arrangement according to a first embodiment of the present invention, purified water having a resistivity of for example 18.24 MΩ-cm (at 25° C.) is supplied to a semiconductor device 11 to be treated, at a supply rate of 20 cc/sec via a teflon pipe having a nominal diameter of ⅛" that is provided at the end portion of an apparatus for removing electrostatic charges shown in FIG. 1. In FIG. 1, reference numeral 1 denotes purified water serving as high resistivity liquid, reference numeral 3 denotes a pipe-shaped conductive element made of SUS 316 having a nominal diameter of ⅛", and reference numeral 4 denotes a plastic pipe made of an insulating material such as teflon. Reference numeral 10 denotes an electric power supply for holding the conductive material 3 at a specific potential via an electric wire 5.

Figure 10:
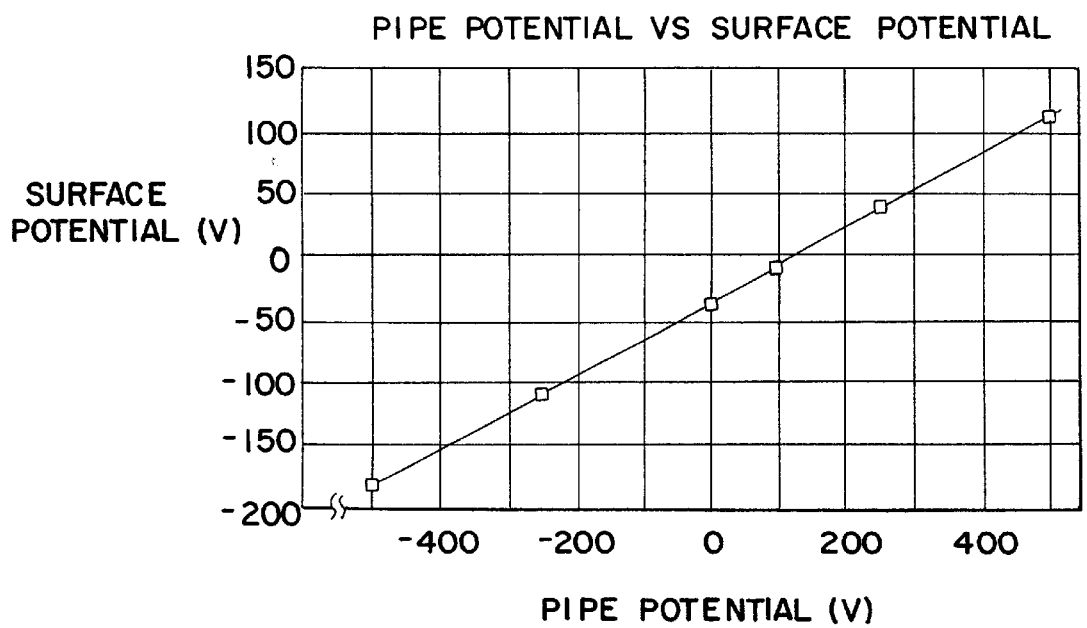
FIG. 10 is a graph showing the relationship between the pipe potential and the surface potential.

FIG. 10 shows experimental results regarding the relationship between the pipe potential applied to the conductive element 3 and the surface potential of the device to be treated wherein the surface potential is induced by the electrostatic charge arising from the contact with the purified water 1. From this figure, it can be seen that a specific potential of about 100 V is preferable to be applied to the conductive element 3 to have a surface potential of about 0 V for the object 11 to be treated. However, the specific potential of the conductive element 3 which is required to have a 0-volt surface potential for the object 11 to be treated varies depending on the conditions such as the type of liquid used, the flow rate of the liquid, etc. In some cases, an opposite polarity of the specific potential is preferable. The specific potential can be easily optimized by measuring the surface potential of the object to be treated, and thus the embodiment of the present invention can be applied to a variety of high resistivity liquid for various liquid supply conditions. For example, in the case of purified water, if its flow rate is increased by a factor of 10, the specific potential of the conductive element 3 required to have 0-volt surface potential for the object to be treated is about 90 V.

When DMF (dimethylformamide) having a resistivity of 17 MΩ-cm is used as the high resistivity liquid, the preferable specific potential is in the region from −200 V to 200 V.

As described above, the apparatus for removing electrostatic charges according to this embodiment can be advantageously applied to purified water and other various types of high resistivity liquid.

Embodiment 2

The second embodiment differs from the first embodiment in that the conductive element 3 comprises iron whose surface is plated with nickel.

This embodiment can also be used to have a 0-volt surface potential for the object 11 to be treated. The specific potential of the conductive element 3 required for that is similar to that in the case of the first embodiment.

Embodiment 3

The third embodiment differs from the first embodiment in that the conductive element 3 comprises stainless steel containing 16.0% to 19/0% chromium, wherein an insulating film 2 comprising chromium oxide in the passive state is provided on the surface of the conductive element 3.

Figure 11:
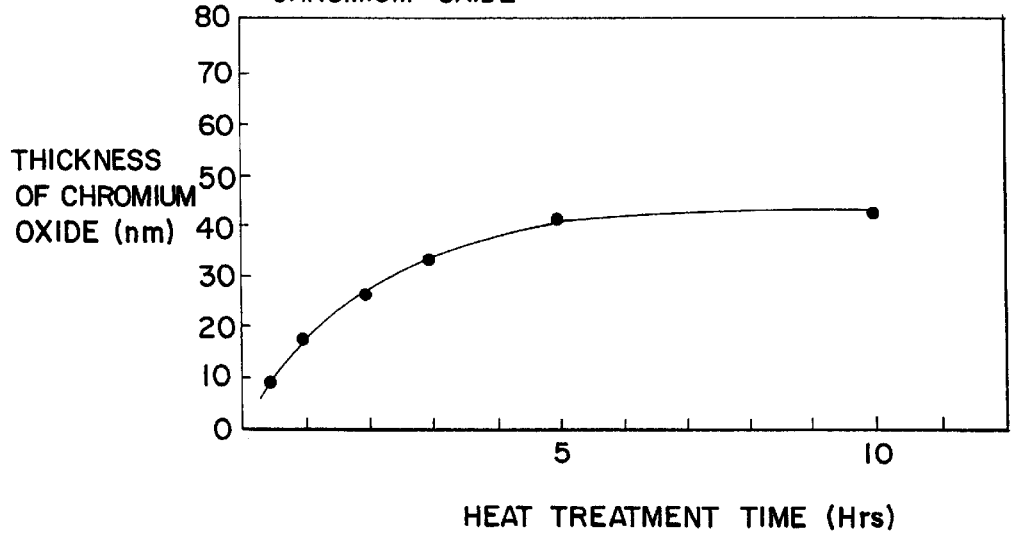
FIG. 11 is a graph showing the relationship between the heat treatment time and the thickness of chromium oxide.
Figure 14:
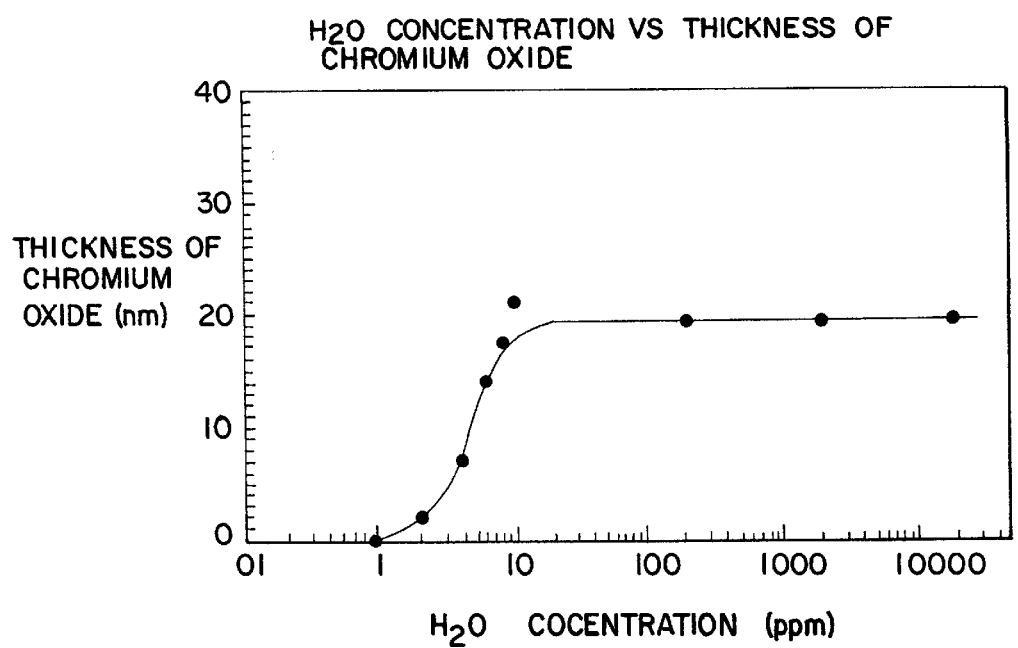
FIG. 14 is a graph showing the relationship between the $H_2O$ concentration and the thickness of chromium oxide.
Figure 15:
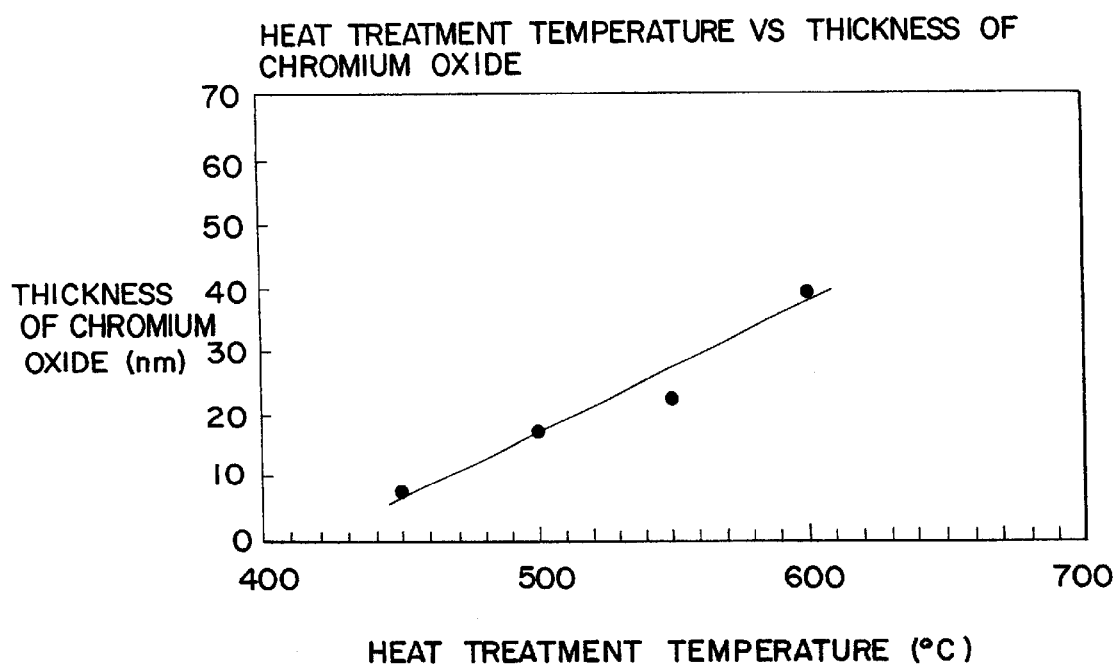
FIG. 15 is a graph showing the relationship between the heat treatment temperature and the thickness of chromium oxide.

The chromium oxide in the passive state may be produced for example according to the following steps. First, the inner surface of stainless steel containing 16.0%–19.0% chromium is ground to form small grains (a few nm). After that, the surface is heat-treated in the weak acid atmosphere (Ar+10 ppm $H_2O$+10% $H_2$) at 500° C. The thickness of the chromium oxide can be controlled by changing the heat treatment time as shown in FIG. 11. As can be seen from FIG. 11, a 10 nm $CrO_2$ film can be formed by a 30 min heat treatment. FIG. 14 shows the relationship between the $H_2O$ concentration and the thickness of the obtained chromium oxide for the $H_2$ concentration of 10%, the heat treatment temperature of 500° C., and heat treatment time of 60 min. From FIG. 14, it can be seen that the $H_2O$ concentration equal to or grater than about 10 ppm is preferable. FIG. 15 shows the relationship between the heat treatment temperature and the thickness of the chromium oxide for the $H_2$ concentration of about 10%, the $H_2O$ concentration of about 10 ppm, and the heat treatment time of 60 min. From this figure, it can be seen that the thickness of the chromium oxide increases as the heat treatment temperature increases. This means that the thickness of the chromium oxide can be controlled to a desired arbitrary value.

In this embodiment, the thickness of the chromium oxide which is used as the insulating film is preferably in the range from 2 nm to 20 nm, and more preferably in the range from 2 nm to 10 nm. The chromium content included in the stainless steel is preferably greater than 16%, and more preferably greater than 18% so that the insulating film may be formed on the surface of the conductive element 3 wherein the insulating film has such a thickness that a tunneling current can flow through the insulating film.

This embodiment can also provide a 0-volt surface potential for the object 11 to be treated. The specific potential of the conductive element 3 required for that is similar to that in the case of the first embodiment.

In addition, the present embodiment not only can hold the high resistivity liquid at the specific potential but also can protect the high resistivity liquid from the dissolution of metallic ions.

Therefore, this embodiment can also prevent the highly purified high resistivity liquid from being contaminated.

Embodiment 4

The fourth embodiment differs from the first embodiment in that there is provided a potential controller 91 between the conductive element 3 and the electric power supply 10. The potential controller 91 controls the generation voltage of the electric power supply such that the conductive element 3 may always be held at the specific potential regardless of the supplying condition of the high resistivity liquid. With the arrangement according to this embodiment, if the supplying condition of the high resistivity liquid 1 varies, then the potential of the conductive element 3 is controlled so that the surface potential of an object to be treated is held at about 0 V.

Embodiment 5

The fifth embodiment differs from the first embodiment in that the high resistivity liquid 1 is supplied as a jet stream to an object to be treated. The pressure of the jet stream is preferably 1.7 $kgf/cm^2$.

Figure 12:
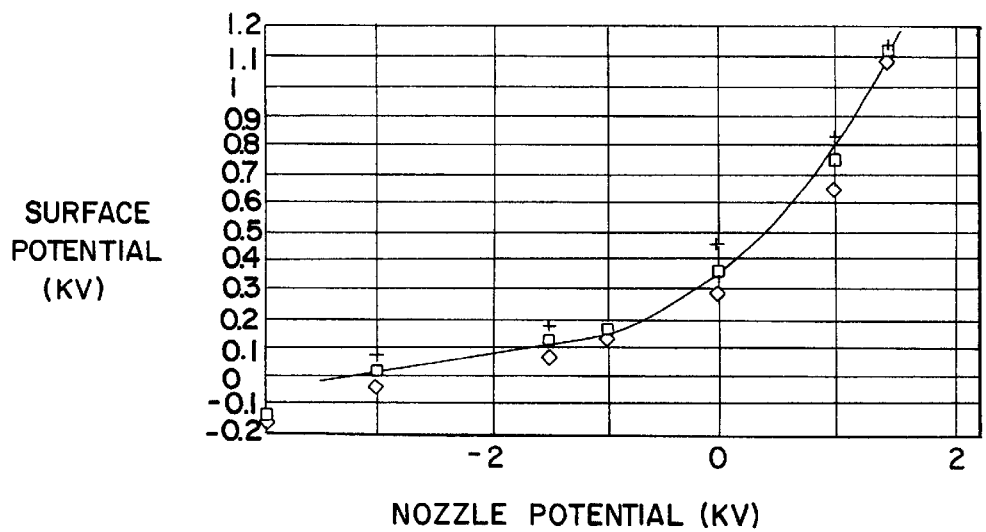
FIG. 12 is a graph showing the relationship between the nozzle potential and the surface potential.

FIG. 12 shows the relationship between the potential applied to the nozzle 9 and the surface potential of an object 11 to be treated.

From this figure, it can be seen that a specific potential of about −3000 V is preferable to be applied to the conductive element 3 to have a surface potential of about 0 V for the object 11 to be treated. Also in this embodiment as in the first embodiment, the specific potential can be easily optimized by measuring the surface potential of the object to be treated, and thus the arrangement of this embodiment can be applied to a variety of high resistivity liquid for various liquid supply conditions.

Embodiment 6

Figure 5:
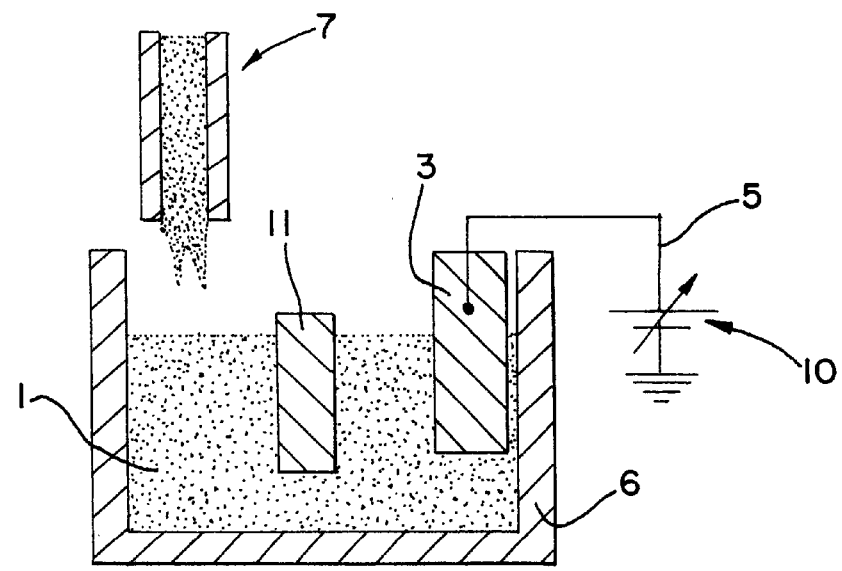
FIG. 5 is a cross-sectional view showing the arrangement of a sixth embodiment.

Referring to FIG. 5, a sixth embodiment will be described below. In this embodiment, purified water having a resistivity of 18.24 MΩ-cm (at 25° C.) is used to clean an object to be treated. In FIG. 5, reference numeral 1 denotes purified water serving as the high resistivity liquid, reference numeral 3 denotes a conductive element made of SUS 316, and reference numeral 6 denotes a treatment container made of teflon, which is one of insulators. Reference numeral 7 denotes a pipe for supplying the high resistivity liquid. Reference numeral 10 denotes an electric power supply for holding the conductive material 3 at a specific potential via an electric wire 5. Reference numeral 11 denotes an object to be treated.

This embodiment can also provide a 0-volt surface potential for the object 11 to be treated. The specific potential of the conductive element 3 required for that is similar to that in the case of the first embodiment. If stainless steel is used as the conductive element 3 and if an insulating film comprising chromium oxide in the passive state is formed on the surface of the stainless steel as in the case of the third embodiment, then it becomes possible not only to hold the high resistivity liquid at a required potential but also to protect the high resistivity liquid from the dissolution of metallic ions.

Therefore, this embodiment can also prevent the highly purified high resistivity liquid from being contaminated.

Embodiment 7

Figure 6:
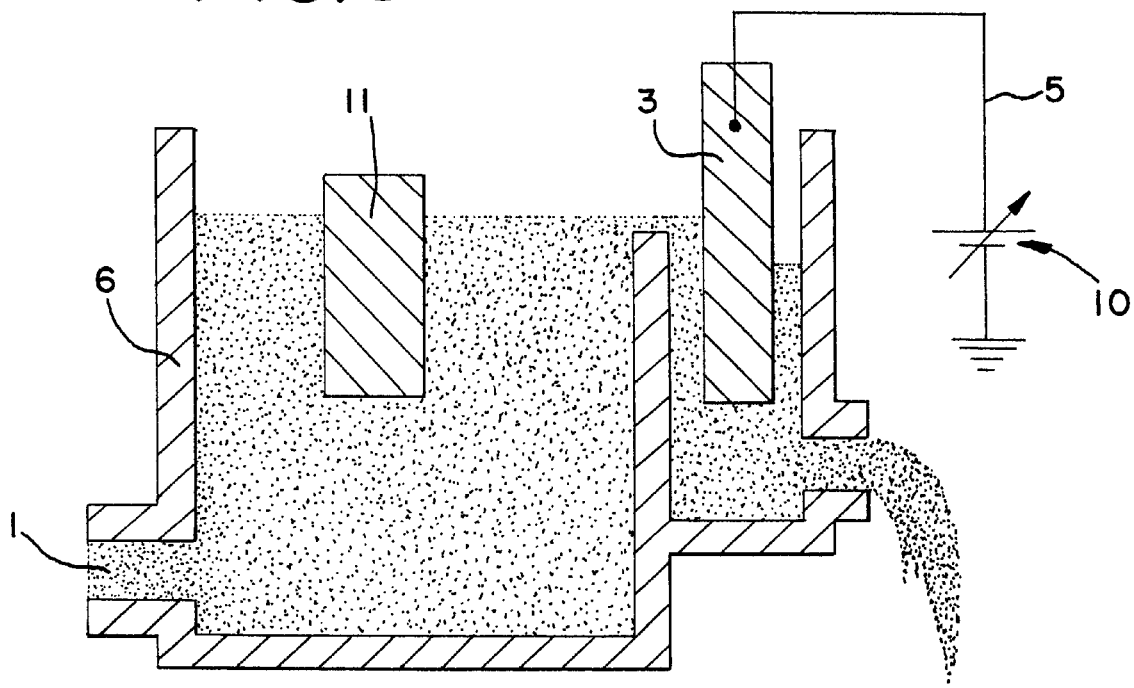
FIG. 6 is a cross-sectional view showing the arrangement of a seventh embodiment.
Figure 7:
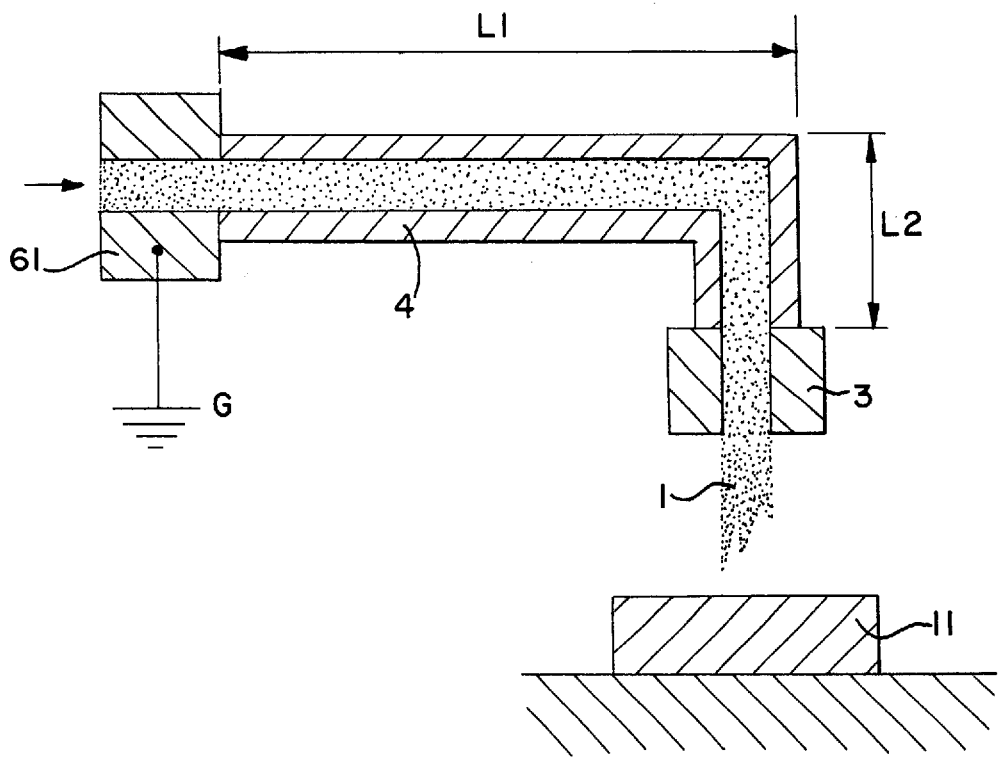
FIG. 7 is a cross-sectional view showing the arrangement of an eighth embodiment.
Figure 8:
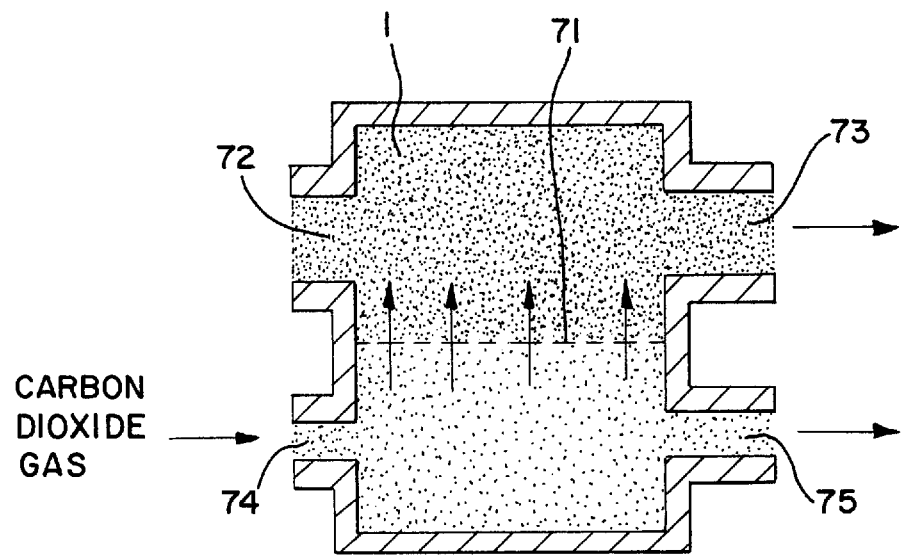
FIG. 8 is a cross-sectional view illustrating a conventional technique.
Figure 9:
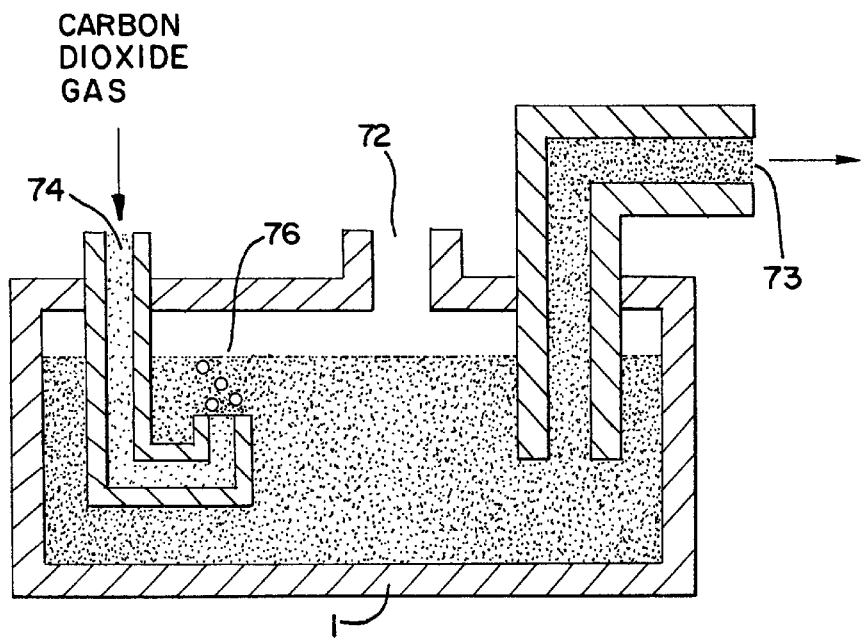
FIG. 9 is a cross-sectional view illustrating a conventional technique.

The seventh embodiment differs from the sixth embodiment in that an object 11 to be treated is soaked and cleaned in a flow of high resistivity liquid 1, and that a conductive element 3 is disposed in an overflow portion of the high resistivity liquid flow, and furthermore that the conductive element is made of copper, as shown in FIG. 6.

This embodiment can also provide a 0-volt surface potential for the object 11 to be cleaned. The specific potential of the conductive element 3 required for that is similar to that in the case of the first embodiment.

In this arrangement according to this embodiment, the conductive element 3 is disposed at a downstream location in the liquid flow relative to the object to be treated 11, whereby the object 11 to be treated is prevented from being contaminated with metallic ions which might be dissolved into the high resistivity liquid from the conductive element 3.

Embodiment 8

The eighth embodiment differs from the fifth embodiment in the following points. The high resistivity liquid 1 is supplied through a plastic pipe 4, a conductive element 61 disposed at the root of the plastic pipe 4, and a conductive element 3 disposed at the end of the plastic pipe 4, from which the high resistivity liquid emerges toward the object to be treated. The conductive pipe 61 is electrically grounded, whereas no voltage is directly applied to the conductive element 3 so that the conductive element 3 may float at a specific potential.

Figure 13:
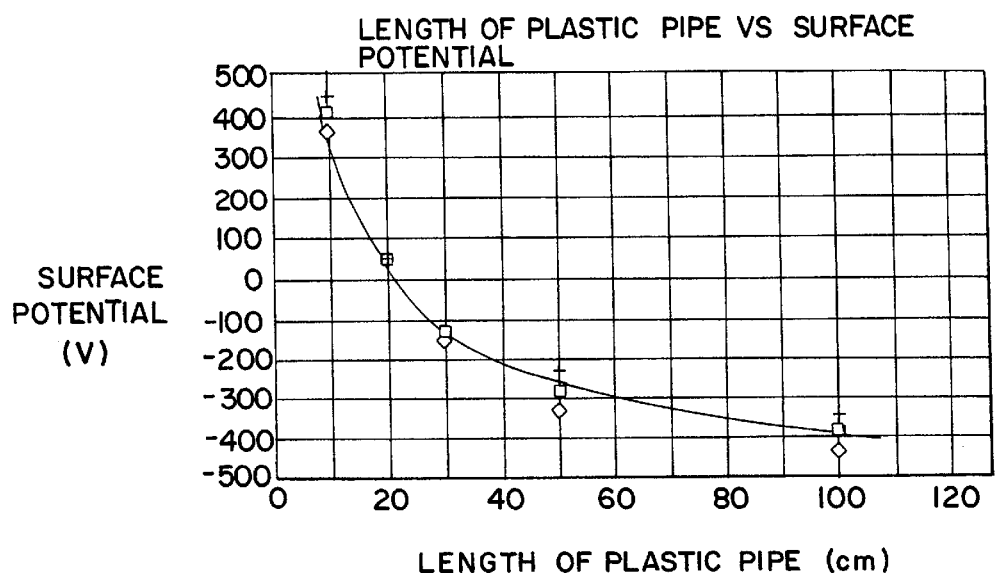
FIG. 13 is a graph showing the relationship between the length of a plastic pipe and the surface potential.

In the arrangement according to this embodiment, the conductive element 3 disposed at the end of the plastic pipe 4 can be held at a specific potential by optimizing the length (L1+L2) of the plastic pipe 4 through which the high resistivity flows, whereby the surface potential of the object 11 to be treated can be held at about 0 V. FIG. 13 shows the relationship between the length of the plastic pipe 4 and the surface potential of the object 11 to be treated.

From this figure it can be seen that in the case where purified water having a resistivity of 18.24 MΩ-cm (at 25° C.) is used as the high resistivity liquid, and the inner diameter of the plastic pipe 4 is ⅛", if the length (L1+L2) of the plastic pipe 4 is about 25 cm, then the conductive element 3 disposed at the end of the plastic pipe is held at an optimum potential to have a 0-volt surface potential for the object 11 to be cleaned. As in the first embodiment, the optimum length of the plastic pipe varies depending on the various supply conditions of the high resistivity liquid. For example, instead of grounding the conductive element 61 disposed at the root of the plastic pipe 4, this conductive element 61 may be held at a specific potential so as to hold the electric element 3 disposed at the end of the plastic pipe 4 at an optimum potential.

As described above, according to the first aspect of the present invention, the object to be treated becomes free of surface charges which may otherwise be induced electrostatically, and highly purified high resistivity liquid is prevented from being contaminated. Thus, the present invention provides the high resistivity liquid which can be used for the production of semiconductor devices or liquid crystal devices which are sensitive to the electrostatic charge without damaging these devices.

Moreover, there is neither residual carbonates nor dissolved carbon dioxide which may make the high resistivity liquid acid. As a result, there is no danger of damage to the semiconductor devices or liquid crystal devices. Furthermore, it is possible to perfectly avoid the problem that the carbon dioxide dissolved in the high resistivity liquid is vaporized due to the change in temperature or pressure and thus vaporized gas chokes the pipe.

In the method of removing electrostatic charges from high resistivity liquid according to the second aspect of the present invention, the conductive element according to the first aspect is provided with an insulating film on the surface thereof, wherein the insulating film has such a thickness that a tunneling current can flow through the insulating film, thereby not only obtaining the same advantages as those in the first aspect, but also preventing metallic ions from being dissolved into the highly purified high resistivity liquid.

In the method of removing electrostatic charges from high resistivity liquid according to the third aspect of the present invention, the insulating film according to the second aspect comprises a chromium oxide in the passive state, and the conductive element comprises stainless steel, thereby ensuring the formation of the insulating film that has such a thickness that a tunneling current may flow through the insulating film.

Thus, the method according to the third aspect of the present invention provides the reliable implementation of the second aspect.

In the method of removing electrostatic charges from high resistivity liquid, according to the fourth aspect of the present invention, purified water is used as the high resistivity liquid according to any aspects from the first through the third, whereby the present invention may be applied to a cleaning process with the purified water which is very popular in the production of semiconductor devices or liquid crystal devices. Thus, the advantages of the present invention according to the first through the third aspects can be realized in the production of these devices. Moreover, it is possible to avoid breeding of bacteria.

The apparatus for removing electrostatic charges from high resistivity liquid, according to the fifth through eighth aspects, provide implementation of the methods of removing electrostatic charges from high resistivity liquid according to the first through fourth aspects of the present invention.

What is claimed is:

1. An apparatus for removing electrostatic charges from a high resistivity liquid, comprising:

a conduit for directing the high resistivity liquid onto a selected object, the selected object having a surface, the conduit including an outlet through which the high resistivity liquid exits the conduit before striking the selected object;

a conductive element provided adjacent the outlet of the conduit such that the high resistivity liquid contacts the conductive element before exiting through the outlet; and a voltage applying means for applying a specific voltage to the conductive element and for setting a potential of the conductive element to a set potential such that the surface of the selected object attains zero potential when the high resistivity liquid is being supplied from the conduit to strike the selected object, wherein the voltage applying means is a DC power supply arranged between the conductive element and the ground, and wherein the voltage applying means is further provided with a potential controller for controlling an occurred potential of the power supply between the conductive element and the DC power supply.

2. An apparatus for removing electrostatic charges from a high resistivity liquid, comprising:

a conduit for directing the high resistivity liquid onto a selected object, the selected object having a surface, the conduit including an outlet through which the high resistivity liquid exits the conduit before striking the selected object;

a conductive element provided adjacent the outlet of the conduit such that the high resistivity liquid contacts the conductive element before exiting through the outlet, wherein the conductive element is provided with an insulating film on the surface thereof, the insulating film having such a thickness that a tunneling current could flow through the insulating film; and a voltage applying means for applying a specific voltage to the conductive element and for setting a potential of the conductive element to a set potential such that the surface of the selected object attains zero potential when the high resistivity liquid is being supplied from the conduit to strike the selected object, wherein the voltage applying means is a DC power supply arranged between the conductive element and the ground, and wherein the voltage applying means is further provided with a potential controller for controlling an occurred potential of the power supply between the conductive element and the DC power supply.

3. An apparatus for removing electrostatic charges from high resistivity liquid according to claim 2, wherein the insulating film consists of a chromium oxide in the passive state.

* * * * *